United States Patent [19]

Stratmann et al.

[11] Patent Number: 4,465,419
[45] Date of Patent: Aug. 14, 1984

[54] METHOD AND APPARATUS FOR CONTROLLING THE VOLUMETRIC CHARGE OF A COKE OVEN FURNACE

[75] Inventors: Josef Stratmann, Recklinghausen; Claus Urbye, Flaesheim; Willi Brinkmann, Herne, all of Fed. Rep. of Germany

[73] Assignee: Firma Carl Still GmbH & Co. KG, Fed. Rep. of Germany

[21] Appl. No.: 364,655

[22] Filed: Apr. 2, 1982

[30] Foreign Application Priority Data

Apr. 9, 1981 [DE] Fed. Rep. of Germany ....... 3114338

[51] Int. Cl.³ .............................................. B65G 67/06
[52] U.S. Cl. ...................................... 414/328; 141/1; 141/67; 414/21; 414/786
[58] Field of Search ................ 414/21, 291, 292, 294, 414/295, 299, 328, 373, 397, 786; 141/1, 4, 5, 67, 68, 83, 233, 263, 387, 388; 222/450; 177/59

[56] References Cited

U.S. PATENT DOCUMENTS 3,605,831 9/1971 Mitchell et al. ..................... 141/388
3,788,368 1/1974 Geng et al. ......................... 222/450
3,881,610 5/1975 Hessling ........................... 414/299 X Primary Examiner—Robert G. Sheridan
Attorney, Agent, or Firm—McGlew and Tuttle

[57] ABSTRACT

A method of measuring out a furnace charge of a pre-dried and preheated coal in a closed system in which the coal is fed from a bottom discharge of a storage bunker into a filling cart container which is disposed thereunder comprises opening the bottom discharge of the storage bunker to permit the fall of the coal from the bunker into the container while blocking off a portion of the filling container space until the remaining space in the filling container is filled and coal no longer flows through the bottom discharge and a column of coal remains in the discharge above the filling cart. A shutoff member is then directed through the column of coal in the bunker discharge above the filling cart container, to cut the column above the upper edge of the filling cart container, and opening the blocked-off portion in the filling cart container space to absorb the coal within the filling cart container. The filling cart comprises a container having a filler nipple which is adapted to engage against the bottom of the bunker discharge. The filler nipple defines an inlet for the container and the container contains a space blocking member such as a displaceable pendulum flap which is mounted in the container adjacent the nipple but out of the inflow path of the coal.

13 Claims, 4 Drawing Figures

METHOD AND APPARATUS FOR CONTROLLING THE VOLUMETRIC CHARGE OF A COKE OVEN FURNACE

FIELD AND BACKGROUND OF THE INVENTION

The invention relates in general to coking and in particular to a new and useful method for the volumetric analysis of a furnace charge of predried and preheated coal in a closed system and to a device to implement the method.

Besides the system of chain conveyors which are disposed on the batteries and from which the coal is filled into the furnaces by means of transfer carts or fixed connectors, the use of a hot coal filling cart has proven out well in large industrial facilities for charging horizontal chamber furnaces with preheated coal.

However, special problems crop up when filling hot coal filling carts with preheated coal from the hot coal storage bins because there are some vital differences as compared to filling wet coal filling carts with wet coal from the coal bunkers. First, the filling itself must take place in a closed system to avoid all dust emission and the hazard of fire and explosion. Secondly, preheated coal has a totally different flow behavior from wet coal. Especially due to the addition of considerable amounts of inert gas, the fluidization of preheated coal is intensified.

Now, when using the hot coal filling cart it is necessary to make the closure between the filling containers of the filling cart so flexible that the filling cart can be driven under the storage bins for each charge, and a firm and gastight seal is provided for the duration of the filling operation and that this connection can be broken again subsequently. At the same time, there must be assurance that the amount of coal corresponding to a furnace charge reaches the hot coal filling cart every time.

Hot coal filling carts are known at present where the furnace charge is measured in preweighing bins disposed between the actual hot coal storage bin and the hot coal filling cart (see the publication "Experiences using preheated coal", Technische Mitteilungen, vol. 73, No. 10/80, pages 824-830). Such a coal premeasuring device is described there and is shown in the pictures 3 and 4. Two rows of four premeasuring funnels each are installed there underneath the bunker. Each of these funnels is standing on three pressure pickups by which the respective weight of the furnace charge can be determined. In addition, level indicators and pyrometers are mounted to the upper and lower part of the funnels, by means of which the volume in the funnels is determined. The bucket wheel charging valve between storage bunker and preweighing bins must be shut off as a function of the weight indication and of the level and pyrometer readings when the fill volume is reached. This system, with its great number of preweighing funnels and its weight determination through pressure pickups and volume determination through pyrometers, is very costly and laden with a number of error sources, for instance, when light wind forces can influence the weight determination. Moreoever, due to the interposition of these preweighing bins the actual coal bunker tower must be built about 10 to 12 m higher.

SUMMARY OF THE INVENTION

The invention makes it possible to obtain a volumetric analysis of a furnace charge with a simpler design of the preweighing bins and of the automatic discharge of the bucket wheel charging valve as well as of the other expensive measuring systems. In addition, a reliable determination of the furnace charge is possible. Particularly overfilling and underfilling of the filling containers is avoided.

According to the invention, the coal is filled into the containers of a filling cart from the storage bunkers directly without forced discharge, and the coal column is cut after the filling process by a shutoff member between the storage bunker and the filling cart container, and the coal between the lower edge of the shutoff member and the upper edge of the filling cart container is absorbed by opening a space in the filling cart container which was closed up to this point in time. The special feature of this method according to the invention is that the coal is poured in free fall into the filling cart containers unhindered, without having to expend any additional energy, and that the flow of coal practically does not have to be stopped by any measuring signal, but is terminated automatically when the entire system has run full. Due to the subsequent opening of an empty space in the upper part of the filling cart container success has been achieved in removing residual coal remaining in the transition. By lowering the sealing member between storage bunker and filling cart only a little, the gastight seal is broken and the filling cart can be moved to the coking oven which is to be filled next without the possibility of hot coal trickling over the edge of the filling cart container in any way.

In order to assure that all filling cart containers are indeed filled completely before the shutoff members are closed, the invention provides, furthermore, that the filling cart is standing on a bridge scale while being filled and that the shutoff member between storage bunker and filling cart container is closed only after a filled weight, settable at the bridge scale has been reached. In this case, the function of the bridge scale can be limited to a pure control function. An exact pickup of the furnace charge weight is not absolutely necessary because the system itself makes particularly overfilling of the filling cart containers impossible.

According to the invention, it is proposed further that the gastight seal between storage bunker and upper edge of the filling cart containers be brought about by hydraulic or pneumatic sealing elements under constant pressure, the force exerted on the filling cart together with the empty weight of the filling cart being set and compensated at the bridge scale before the filling operation. Therefore, a weight determination of the furnace charge is also possible in combination with these sealing elements and the respective taring of the bridge scale after the tight seal has been established. This compensation of sealing member forces was not possible with the present telescopes and other raisable and lowerable transfer means because they could not be kept constant.

So that the filling cart containers can always fill up completely, even when bridges may form in the bunker discharge, it has proven to be advantageous to set automatic discharge aids into motion after an adjustable period of time after the shutoff member between storage bunker and filling cart container was opened, if the desired filled weight was not reached. These discharge aids may consist of stoking rods or oscillating flaps. The injection of a fluidization agent also has proven out well (see German Disclosure No. 27 38 761).

To implement this method according to the main claim a device is proposed according to the invention which is characterized in that each filling cart container of a filling cart have a superstructure with an upper inlet nipple smaller in cross-sectional area than the superstructure and that there be disposed in the superstructure outside of the coal filling path at least one pendulum flap suspended from a horizontal shaft. While filling the coal into the filling cart container, this pendulum flap is arranged vertically, or at least very steeply, until the upper shutoff slide has been closed. The pendulum flaps are advantageously adjustable steplessly by hydraulic cylinders or positioning motors via shafts coming out of the superstructure horizontally and via linkages. This lockability or stepless adjustability of the pendulum flap makes it possible to vary the volume to be filled into the filling cart containers in accordance with the bulk density of the coal in that the flap is kept in the beginning either exactly vertically or in a certain oblique position. However, it is important in this process that a minimum volume be left over which can be released after the filling operation is concluded.

Because the flowability of preheated coal is very great and because the coal already filled in could grow out of the filler nipple into the superstructure it is additionally suggested according to the invention that a sheet metal cover be disposed in the superstructure below each pendulum flap, which cover extends in circular arc shape according to the curved path of the end point of the pendulum flap so that the latter can be operated without touching. Accordingly, the coal filled in can push up to under the sheet metal cover according to the invention, but a free space remains in any case between the sheet metal cover, the pendulum flap and the outer upper superstructure wall. If some coal remains on the sheet metal cover while the preheated coal is filled into the furnace chamber, it is pushed back into the containers when the pendulum flap is pivoted back into its vertical position.

Accordingly, it is an object of the invention to provide a method of measuring out a furnace charge of predried and preheated coal in a closed system in which the coal is fed from a bottom discharge of a storage bunker to a filling cart container which is disposed therebeneath and which comprises opening the bottom discharge of the storage bunker to permit the fall of the coal from the bunker into the container while blocking off a portion of the filling cart container until the remaining space in the filling cart container is filled and the coal no longer flows through the bottom discharge and a column of coal remains in the discharge above the filling cart container, and thereafter directing a shutoff member through the column of coal to cut the column at a location above the upper edge of the filling cart container and opening the blocked off portion of the filtering cart space thereafter in order to absorb the coal which remains in the column below the cutoff into the filling cart container.

A further object of the invention is to provide a filling cart for use with a predried and preheated coal storage bunker which has a bottom discharge and is closable by a displaceable flat shield and which comprises a container having a filler nipple adapted to engage against the bottom of the discharge and with an inlet in the nipple for feeding coal into the container, and wherein the container has a space blocking member mounted therein adjacent the nipple which is out of the inflow path of the coal and which is movable between a plurality of positions selectably blocking portions of the container from the inflow of coal so as to leave a selected portion of the container which is not filled during the filling operation, and control means connected to the space blocking member for moving it after filling and the closing off at the bottom discharge of the bunker to open additional space to receive the coal which remains above the filler nipple within the container.

A further object of the invention is to provide a device for transferring coal in a coking furnace which is simple in design, rugged in construction and economical to manufacture.

The various features of novelty which characterizes the invention are pointed out with particularity in the claims annexed to and forming a part of the invention. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENT

Figure 1:
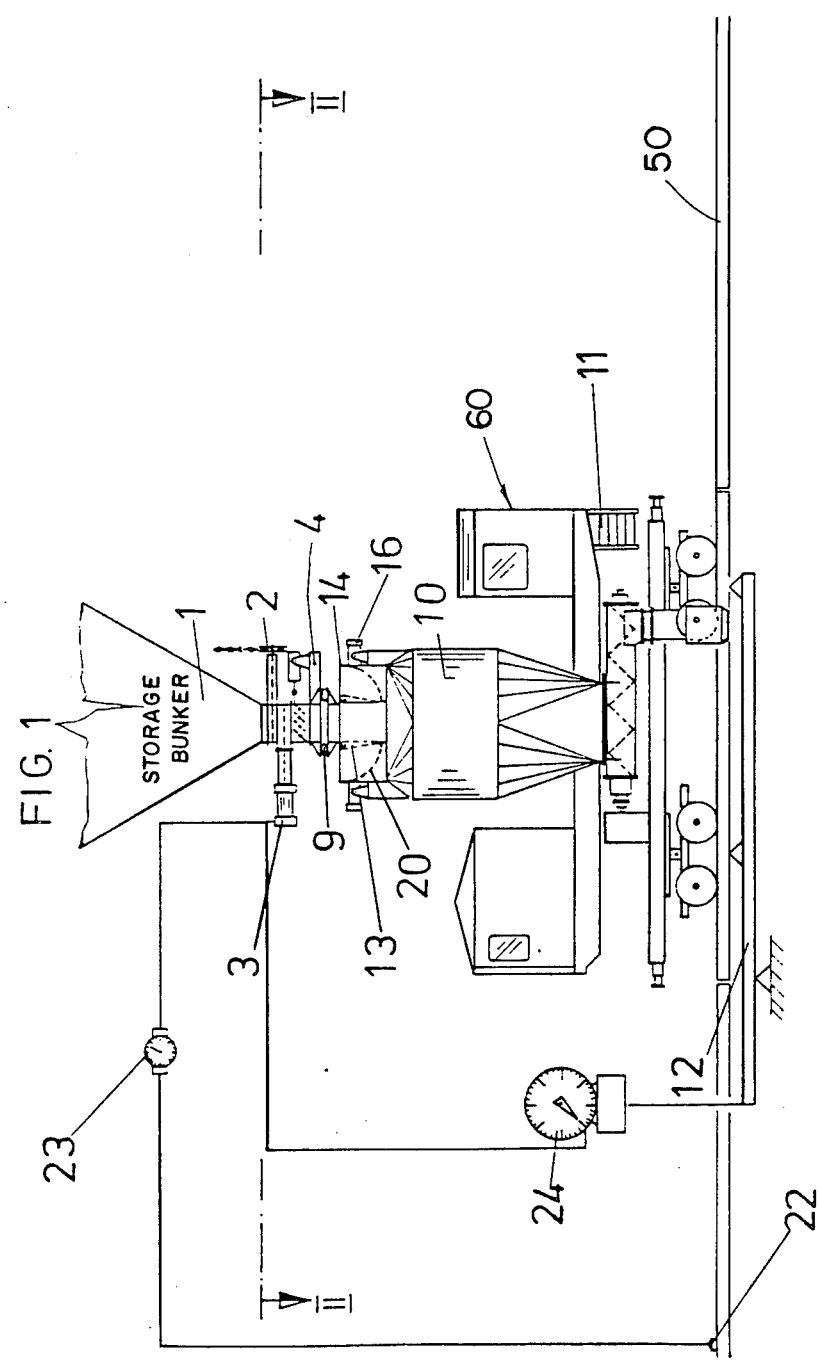
FIG. 1 is a schematic side elevational view of a filling cart system shown in association with a storage bunker and movable along a trackway of a coke oven in accordance with the invention.
Figure 2:
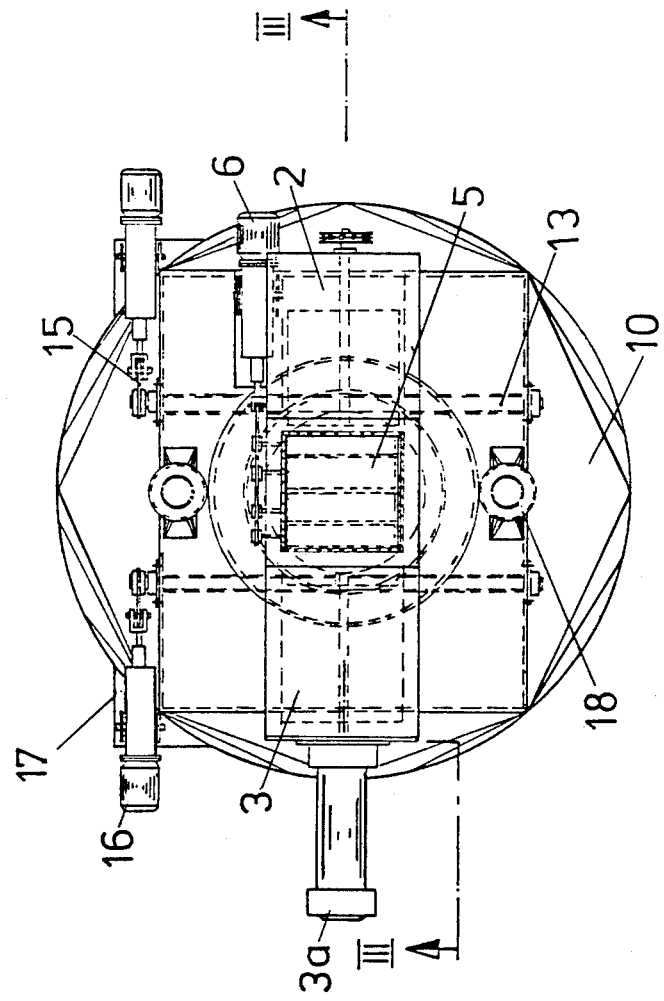
FIG. 2 is a partial top view and partial transverse sectional view taken along the line II—II of FIG. 1.
Figure 3:
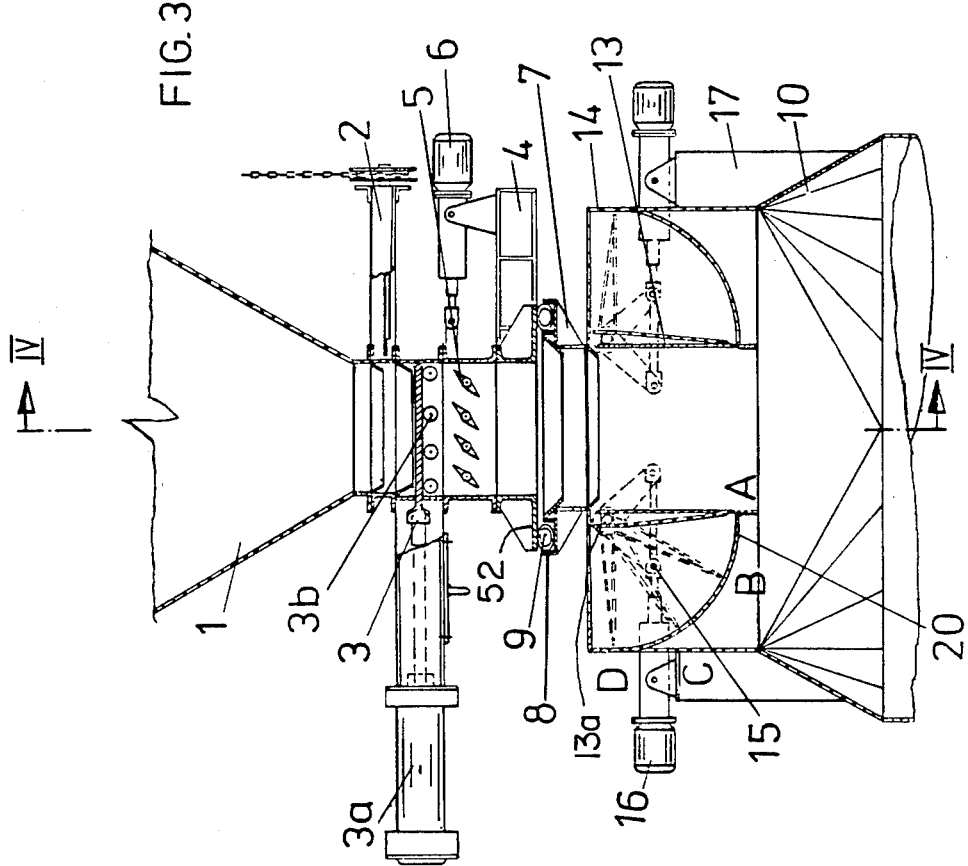
FIG. 3 is a section taken along the line III—III of FIG. 2.
Figure 4:
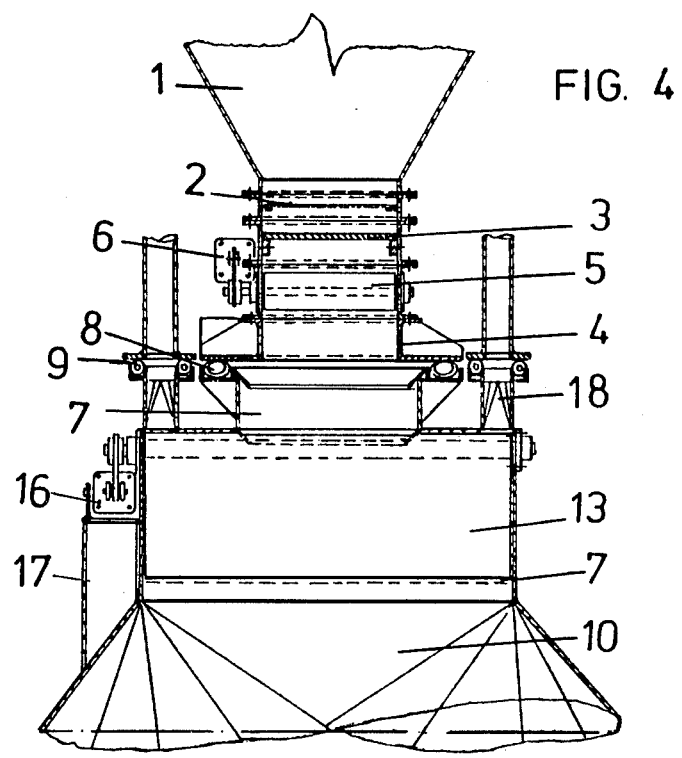
FIG. 4 is a section taken along the line IV—IV of FIG. 3.

Referring to the drawings, in particular the invention embodied therein, comprises a filling cart generally designated 60 which is adapted for use in a coking system in which a predried and preheated coal is disposed in a storage bunker 1 which has a bottom discharge which is closable by a displaceable flat slide 3. The filling cart 60 includes a vehicle undercarriage 11 for carrying a container 10 and which is adapted to move along a trackway 50 over a bridge scale 12 during the charging thereof. The container 10 has a filler nipple 7 shown best in FIG. 4 which is adapted to engage against the bottom of the discharge of the storage bunker 1 and it provides an inlet for the filling of the container 10. The container 10 in accordance with the invention has a space blocking member or pendulum 13 or a plurality of pendulums 13 which as shown best in FIG. 3 are arranged in an upper squared off superstructure 14 directly adjacent to or associated with filler nipples 7 of the container 10. The space blocking member 13 is mounted for movement between a plurality of positions selectively blocking portions of the container from the inflow of coal so as to leave a selected portion of the container which is not filled during the filling operation. Pendulum flaps 13 are operated by a pendulum flap positioner or control 16 and it is movable between a solid line position shown to any one of the dotted line positions B,C,D. A control 16 may be operated after the filling operation is complete and the flat slide 3 is placed to cut off the column of coal within the discharge of the bunker 1. After this is done then the pendulum flap may be moved to open a portion of the space which has been blocked off in order to absorb at least the coal which remains above the top edge of the filler nipples 7 in the lower end of the discharge from the bunker 1.

In FIGS. 1 to 4, only the lower discharge funnel and the emergency shutoff slide 2 of the hot coal storage bunker 1 are shown. This flat slide 2 can be closed by hand for repair purposes. Directly underneath the emergency shutoff slide 2 is the automatically operable flat slide 3 which is opened for every filling operation and reclosed by the adjusting member 3a after each filling operation. The adjusting member may be driven hydraulically or electrically. For easier actuation, this flat slide 3 is mounted on rolls 3b. In order to prevent the highly fluidized preheated coal from shooting out of the storage bunker into the filling cart container too suddenly, a so called flow brake 5 in the form of automatically or manually jalousie flaps is provided below the flat slide 3. In the case shown, this involves four pendulum-type flaps each of which is adjustable about a central horizontal shaft and are actuated from the outside by a common adjusting cylinder 6. During the actual filling operation, these flaps can be held either in an identical oblique position or they may be moved back and forth to improve the flow. The adjusting cylinder 6 and also the lower edge of the storage bunker discharge are fastened jointly to a shifting block 4 having a lower connecting 52 plate for the filling cart.

Belonging to the hot coal filling cart 11 which is movable over a trackway 50 on the furnace top are, in addition to the usual undercarriage, at least two filling cart containers 10 which, according to the invention, have an upper square superstructure 14 with a filler nipple 7. At the upper rim of the filler nipple 7 is a circling slot 8 in which lies an inflatable hose 9 as sealing element. After the empty hot coal filling cart has been moved under the hot coal storage bunker discharge and is standing on the bridge scale 12 on the tracks, the hose 8 is inflated and pushed against the storage bunker discharge connecting plate 52. An adjustable constant internal hose pressure brings about a gastight closure and at the same time exerts a constant force from the sealing element through the filling cart to the filling cart track scale 12, which force does not influence the weight determination. The furnace charge weight is determined best by returning the track bridge scales 12 to zero again before starting each filling operation.

As a special feature the superstructure 14 of the filling cart container 10 contains two pendulum flaps 13,13 which are suspended from a respective horizontal shaft 13a,13a and can be moved or rotated back and forth about their shaft by means of associated positioning members 16 disposed on holding means or supports 17 and driving through a linkage 15.

These pendulum flaps 13 perform the following functions:

The individual filling cart containers 10 are designed as so called measuring bins so that there must be a possibility to vary the respective bin volume when the bulk weight of the coal grades used is different. This requirement can be met by varying the position of the pendulum flaps 13 according to the invention while filling in the coal. For this purpose it is expedient to mount on the outside of the housing superstructure 14 a scale which informs the operator directly of the effective fill volume. In FIG. 3, the letters A,B,C,D, are to indicate different positions of the pendulum flap 13, A (vertical position, shown in solid lines) being coordinated with the smallest fill volume and C (shown dotted) roughly with the biggest fill volume. After the flat side 3 has closed, the pendulum flap is then swung back into the horizontal position D from the positions A or B or C.

Accordingly, the volumetric analysis of a furnace charge is obtained, according to the invention, in that the discharge slide 3 remains open for a unit of time which is settable at a timer 23, until a connecting, gapless quantity of coal is present between the filling cart container 10 and the storage bunker 1. If there were stoppages in the flow of coal, the weight indicator 24 of the bridge scale will indicate that the minimum filling cart weight has not yet been reached, and discharge aids are set into motion automatically. In addition, the weight indicator 24 sends directly to the flat slide 3 a command pulse which prevents premature closing of this flat slide. After the filling cart container has now been filled sufficiently, the column of coal is cut horizontally by the flat side 3, whereupon the pendulum flaps 13 are swung back into their end position D from their positions A, B or C, and the residual coal volume between the lower edge of the flat slide and the upper edge of the filling cart is absorbed by the filling cart superstructure 14. After relieving the pressure hose 9 and removing the connections from the suction nipples 18, which serve the purpose of venting the filling cart during the filling operation, the filling cart may be moved to the respective coking oven to be filled.

Also provided below each pendulum flap 13 is a sheet metal cover 20 which prevents preheated coal from penetrating from below into the space which is released later. These sheet metal covers 20 have roughly the shape of a quarter arc.

While a specific embodiment of the invention has been shown and described in detail to illustrate the application of the principles of the invention, it will be understood that the invention may be embodied otherwise without departing from such principles.

What is claimed is:

1. A method of measuring out a furnace charge of a predried and preheated coal in a closed system in which the coal is fed from a bottom discharge of a storage bunker into a filling cart container disposed therebeneath, comprising opening the bottom discharge of the storage bunker to permit the fall of the coal from the bunker into the container while blocking off a portion of the container space until the remaining space of the container is filled and coal no longer flows through the bottom discharge and a column of coal remains in the discharge above the filling container, directing a shutoff member through the column to cut off the column above the upper edge of the filling container, and opening the blocked off portion of the filling container space to absorb the coal remaining in the storage bunker discharge above the container.

2. A method according to claim 1, wherein the filling container is carried on a cart which is moved over a bridge scale during the filling operation, and including cutting the column of coal to shut off the discharge of the storage bin only after a selected filling weight is indicated at the scale.

3. A method according to claim 1, including establishing a gastight seal between the container and the storage bunker by inflating an inflatable sealing element disposed in the space therebetween.

4. A method according to claim 3, including weighing the container over a scale to indicate the weight therein, compensating the scale for the weight added thereto by the sealing pressure and cutting off the column only after a predetermined weight is indicated on the scale.

5. A method according to claim 1, wherein before the shutoff member is moved to cut off the column to discontinue the feeding of coal, the discharge of the coal from the storage bin to the container is permitted to occur for a predetermined amount of time and including weighing the container during this time and if at the end of the time, the weight is not at the desired fill weight, actuating means in the discharge of the bunker to facilitate the continuance of discharge of a predetermined time.

6. A method according to claim 1, including blocking off a portion of the container space using a blocking member movably mounted to the container and opening the blocked-off portion by moving the blocking member.

7. A filling container for use with a predried and preheated coal storage bunker which has a bottom discharge which is closable by a displaceable flat slide, comprising a container having a filler nipple adapted to engage against the bottom of the discharge with an inlet in said nipple for said container, a space blocking member mounted in the container adjacent said nipple out of the inflow path of the coal from said container and being movable between a plurality of positions selectively blocking portions of said container from the inflow of coal so as to leave a selected portion of the container which is not filled during the filling operation, and control means connected to said space blocking member to move it after filling and after closing off the bottom discharge to open an additional space to receive the coal which remains in the discharge below the displaceable flat slide.

8. A filling container according to claim 7, wherein said space blocking member comprises a pendulum flap, means supporting said flap in said container for rotation, said control means locking said pendulum flap in a selected position between a vertical position and a horizontal position.

9. A filling container according to claim 7, wherein said control means comprises a hydraulic positioning motor, said space blocking member comprising a pendulum rotatably mounted in said container and a positioning motor connected to said pendulum to move said pendulum through a selected position.

10. A filling container according to claim 7, wherein said container includes a rectangular superstructure below said filling nipple of greater dimension than said filling nipple to as to leave space in said container below and to at least one side of said filling nipple, said blocking member comprising a pendulum flap, means rotably supporting said pendulum flap adjacent one side of said filling nipple, said pendulum flap being positionable so as to extend substantially vertically alongside one side of said filling nipple, said control means comprising a fluid pressure operated piston and cylinder combination connected to said flap to shift said flap from a vertical position upwardly in the space alongside said filling nipple to a selected angular position other than the vertical, and including a sheet metal cover disposed in said container offset portion extending in an arc below said pendulum flap shielding the pendulum flap from the remaining portion of said container.

11. A filling container according to claim 7, including the bunker storage discharge having a discharge chute at its lower end terminating in a bottom end face, said container having a filler nipple with an annular duct therearound, an inflatable member disposed in said annular duct being inflatable against the bottom edge of said bunker discharge.

12. A filling container according to claim 11, including a flat slide movable across said lower discharge portion intermediate the height thereof to close off said bunker to cut the column of coal above said filler nipple, and adjustable brake element disposed in said lower discharge below said flat slide plate in a position to deflect the coal passing therebetween.

13. A filling container according to claim 12, wherein said brake elements are pivotal so as to agitate the coal and facilitate the flow thereof.

* * * * *